United States Patent
Ziarati et al.

(10) Patent No.: US 9,454,008 B2
(45) Date of Patent: Sep. 27, 2016

(54) WIDE ANGLE PERSONAL DISPLAYS

(71) Applicant: Resonance Technology, Inc., Northridge, CA (US)

(72) Inventors: Mokhtar Ziarati, North Hollywood, CA (US); T. Scott Rowe, Dana Point, CA (US)

(73) Assignee: Resonance Technology, Inc., Northridge, CA (US)

( * ) Notice: Subject to any disclaimer, the term of this patent is extended or adjusted under 35 U.S.C. 154(b) by 0 days.

(21) Appl. No.: 14/507,695

(22) Filed: Oct. 6, 2014

(65) Prior Publication Data
US 2015/0097756 A1 Apr. 9, 2015

Related U.S. Application Data (60) Provisional application No. 61/887,735, filed on Oct. 7, 2013.

(51) Int. Cl.
*G02B 27/01* (2006.01)
*G02B 3/00* (2006.01)

(52) U.S. Cl.
CPC ......... *G02B 27/0172* (2013.01); *G02B 3/0056* (2013.01); *G02B 2027/0123* (2013.01); *G02B 2027/0132* (2013.01); *G02B 2027/0178* (2013.01)

(58) Field of Classification Search
CPC ............ G02B 27/0172; G02B 3/0056; G02B 2027/0132; G02B 2027/0178
See application file for complete search history.

(56) References Cited

U.S. PATENT DOCUMENTS

| | | | |
|---|---|---|---|
| 4,348,185 A | 9/1982 | Breglia | |
| 4,406,532 A | 9/1983 | Howlett | |
| 5,274,405 A | 12/1993 | Webster | |
| 6,097,543 A | 8/2000 | Rallison | |
| 6,215,593 B1 * | 4/2001 | Bruce | G02B 6/08 359/619 |
| RE37,579 E | 3/2002 | Takahashi | |
| 7,446,941 B2 * | 11/2008 | Fukuda | G02B 3/0006 359/619 |
| 7,495,638 B2 * | 2/2009 | Lamvik | G02B 27/0172 345/76 |
| 2005/0273000 A1 * | 12/2005 | Dinehart | G01R 33/283 600/410 |
| 2012/0092747 A1 * | 4/2012 | Martin | G02B 3/0012 359/290 |
| 2014/0118829 A1 * | 5/2014 | Ma | G02B 5/1885 359/567 |

OTHER PUBLICATIONS

Hoang-Yan Lin, et al., Patterned Microlens Array for Efficiency Improvement of Small-Pixelated Organic Light-Emitting Devices, Jul. 21, 2008, vol. 16, No. 15, Optics Express.

* cited by examiner

*Primary Examiner* — Ilana Spar
*Assistant Examiner* — Mihir K Rayan
(74) *Attorney, Agent, or Firm* — Larry K. Roberts (57) ABSTRACT

An embodiment of a wide angle personal display projector is configured for positioning in relation to a user's eyeball, and includes a curved display layer. A curved micro lens array having a curvature generally matching the display curvature is positioned relative to the display layer so that the micro lens array is between the display layer and the user's eyeball. In another embodiment, a binocular personal display system includes a frame structure for supporting left and right personal display projectors in relation to the user's left and right eyeballs.

25 Claims, 8 Drawing Sheets

WIDE ANGLE PERSONAL DISPLAYS

CROSS-REFERENCE TO RELATED APPLICATIONS

This application claims priority from U.S. Provisional Application No. 61/887,735, filed Oct. 7, 2013, the entire contents of which application are hereby incorporated by reference.

BACKGROUND

Figure 1:
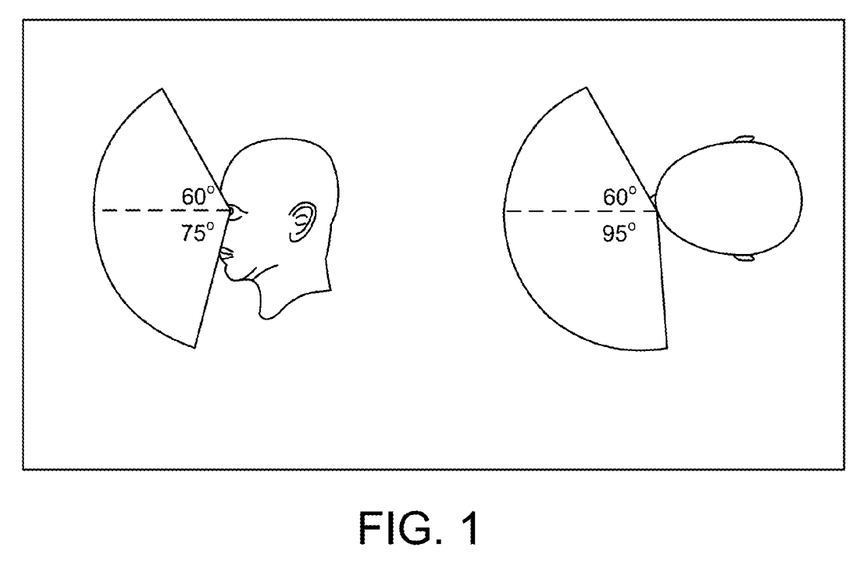
FIG. 1 illustrates a virtual view of wide field of view (FOV) in both horizontal and vertical for one eye.

Personal displays (PD's) have been around for quite a while. Generally, these projection systems take a flat liquid crystal display (LCD) and project this into the human eye. This is fine, but it only produces a subtended Field of View (FOV) of about 45 degrees horizontal. This limited FOV does not induce the virtual reality perception because it does not subtend a sufficient portion of the normal human total FOV, typically 155 degree horizontal, 135 degree vertical, as illustrated in FIG. 1 (binocular vision extends this to almost 180 degree FOV horizontal). More recently, curved displays for virtual reality displays have moved from the laboratory to the market place. These are generally bulky and relatively expensive.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

In the following detailed description and in the several figures of the drawing, like elements are identified with like reference numerals. The figures may not be to scale, and relative feature sizes may be exaggerated for illustrative purposes.

A need exists for a personal display system that can subtend a wide field of view, and still be small enough to fit with an MRI (magnetic resonance imaging) tunnel geometry. This small, low profile personal display system will also be appreciated by others not using it as a patient medical display, but for more general virtual reality projection such as for video gaming, wide screen entertainment, and a virtual reality (VR) display used to control remotely piloted vehicles, such as aircraft (drones), by way of example only.

Exemplary embodiments and methods are disclosed for projecting very wide field images to the human eye as means of providing entertainment, information and creating an artificial reality that creates the perception that the viewer is in another place and time, or in an artificial world. This artificial world can be a means for playing a game, or operating an instrument or machine, interacting with a person or animal, or entertaining the patient during an MRI procedure to reduce the claustrophobia from being inside the tunnel of the MRI, or any other activity that might take place in the real world. A primary application is as a personal display that a person might wear during an examination by an MRI instrument. In this exemplary application, the patient would wear this display, i.e. as a personal display, during an examination. During MRI exams, the patient is placed within a tunnel surrounded by a very large magnetic coil for a scanning procedure. Being scanned within the coil can create a claustrophobic effect for the patient due to the tunnel within the coil, and any movement by the patient during the exam reduces the image quality of the exam. Therefore, personal displays worn by the patient help allay their fears by providing a source of information or entertainment (broadcast TV, movies, etc.) while the exam is being conducted. However, due to the geometry of the magnetic coil, there is very little room around the patient's head for these displays. Therefore the personal display is preferably very compact in profile. It is therefore an object and aim of an exemplary embodiment of the invention to disclose a display for this purpose that not only is very compact and low in profile, but produces a very wide field of view (>70 degrees Horizontal) for each eye such that when viewed in stereo, a virtual reality sensation is produced and the patient loses the sense of being confined in the MRI tunnel.

Another exemplary application is to use this display for fMRI (Functional MRI). For fMRI applications, researchers need to create a realistic 3D environment for the subject undergoing the Brain scan and stimulate various parts of the visual cortex and at the same time measure the brain activity. Currently not very many displays are available with the wide FOV and are compact enough to fit inside the newer small head coil used for MRI brain scans. An MRI system uses various pick up antennas for recording the energy from the body. In the case of a brain scan, the head is inside a smaller cylinder called a head coil. In order to pick up more energy from the brain, the head coil is closer to the head and therefore very tight, on the order of 23 cm to 26 cm.

Figure 2:
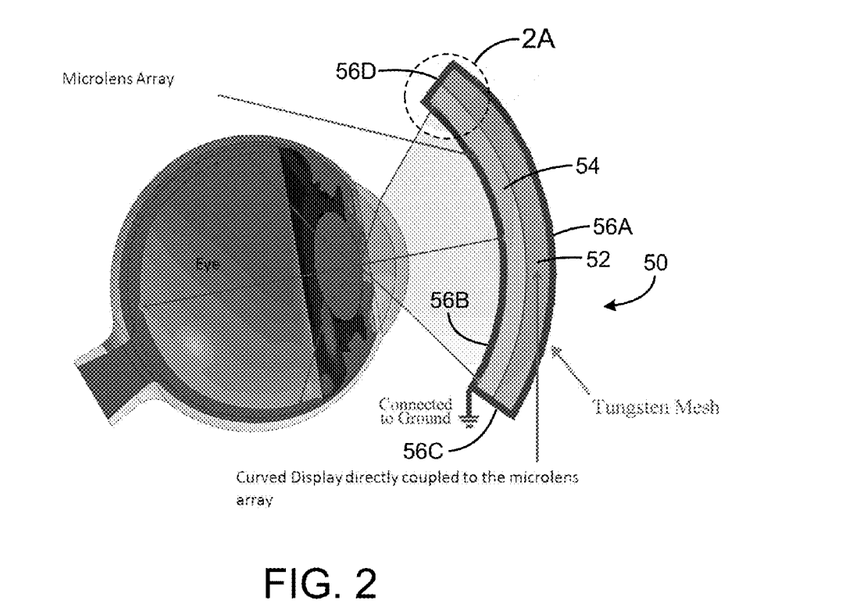
FIG. 2 illustrates an exemplary embodiment of a compact personal display projector for virtual reality environments.

FIG. 2 illustrates an exemplary embodiment of a personal display, as a compact personal display projector for virtual reality environments. FIG. 2 shows the detail of the construction of the optics, the display and method of shielding the entire parts for radio frequency (rf) interference as well as to protect the part from getting damaged or scratched. The exemplary embodiment takes advantage of display technologies which are capable of conforming to curved surfaces. One such display technology suitable for use in this exemplary application is Organic light emitting diode (OLED) display technology. It is possible to apply the OLED display to various shaped materials, including curved surfaces. Other display technologies having the capability of conforming to or being applied a curved surface may alternately be employed. In this exemplary embodiment, the light from the organic light emitting diodes (OLEDs) that create the primary colors are mixed to create each pixel perceived by the eye. The OLEDs are embedded into or attached to a flexible polymer substrate that can be curved in 3 dimensions (e.g., FAMOLED, flexible active matrix light emitting diode, technology). Previously, all display technologies resided on rigid substrates that contained all of the conductors and LED or OLED emitters necessary to make up a display. With the advent of the flexible or conformable display technologies such as OLED technologies, the display designer is freed from having to use silicon (Si) or gallium arsenide (GaAs) or gallium nitride (GaN) as substrates.

The display 50, in an exemplary embodiment, takes this flexible or conformable technology and adds a molding or thermoforming/embossing process to create an ultra-wide field display with a particular curvature. This curvature may be specified so that the human eye could easily image this onto the curved retina with little or no defocus or distortion. This is advantageous for creating a wide field of view display with little or no distortion, something a wide flat display suffers when viewed by the human eye. Extra space is not needed in the optical design of display 50 to correct for distortion or field defocus, something that normally occurs when projecting from a flat surface. This then allows for the total projection system to be made compact and light weight.

Figure 2A:
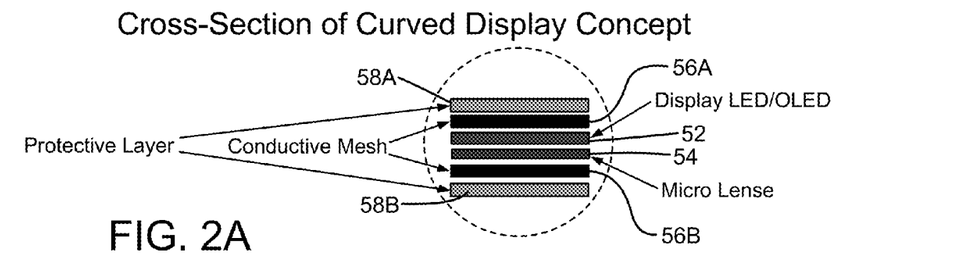
FIG. 2A is an enlarged view of a portion of FIG. 2.

FIGS. 2, 2A and 2C illustrate an exemplary embodiment of a curved personal display 50, in relation to the human eye. FIG. 2 is a diagrammatic cross-section of the display. FIG. 2A shows diagrammatically in exploded view a portion of the display elements within circle 2A of FIG. 2; the curvature of the elements is not depicted in FIG. 2A for simplicity. The display 50 includes an OLED display layer 52 formed as a display element. The OLED display layer is disposed on an outside curved surface of a curved micro lens array structure 54, i.e. so that the micro lens array structure is between the display layer 52 and the user's eye. An extremely wide, immersive field of view is possible, with minimal construction elements.

Typically the micro lens array 54 is fabricated of a molded polymer; a typical material is a PMMA acrylic, but a polycarbonate or other transparent polymers could also be used. The micro lens array may be molded to the net shape of the curved display element, and the OLED/circuitry may be printed onto or attached to the back of the micro lens array, registered with the lens elements themselves. The curvature of the micro lens array 54 and OLED display 52 is preferably a sector of a spherical, or acceptably cylindrical curved surface that subtends >85 degrees horizontally of the human field of view. The precise radius of curvature is a function of the diameter of the micro lens array lenslet, the size of the OLED emitting area and the aforementioned subtended FOV, preferably >85 degrees horizontal and >45 degrees vertical. A typical radius of curvature of the micro lens array fitted display would be 20 mm, although other radii may also be used.

The display layer 52 provides an array of pixels, having a pixel spacing between pixel centers, or pitch. The micro lens array 54 has a pitch that will track the pitch of the display pixels, and the individual lenslets will be registered in position relative to corresponding pixels of the display layer. For OLED display layers, a typical pixel pitch is 150 um on average, but OLED pitches of less than 50 um are known. A display layer pitch will typically have a pitch or pixel spacing in the range of 10 um to 200 um. Pitches larger than 200 um result in displays that are not very useful for the personal display application, and pitches much smaller than 10 um will not collect much light, and will not add to resolution.

The micro lens array 54 is illuminated by the display layer 52, and the (quasi) collimated light beams from the respective lens elements translate pixel information to the eye. By "quasi collimated" is meant that the light rays from the pixel need not be perfectly collimated or parallel, but sufficiently close to parallel or perfectly collimated to create the far field in the human eye so the image appears to be in the far field to the viewer; i.e. to create a virtual image in space so the eye can focus on it. The micro lens array collects light from the display layer pixel elements, (quasi) collimates them so that they appear to subtend a small amount of angular space in the far field to the human eye (no accommodation response is triggered) when the human eye forms an image of them. Of course these lenses are organized in an array such that when certain elements of the array 54 are illuminated by pixels of the display layer 52, a recognizable image is formed.

Electrically conductive mesh layers 56A, 56B sandwich the display layer and the micro lens. Protective layers 58A, 58B (FIG. 2A) may be formed on the outside of the mesh layers. These protective layers may be thin layers of a transparent or translucent plastic material. The conductive layers 56A, 56B are connected at the edges of the display by conductive layers 56C, 56D, which may also be formed of conductive mesh, to form a Faraday cage about the display and micro lens layers 52, 54, in an exemplary embodiment for an MRI application. For the display to work in the MRI room and not cause artifacts in the MRI image, the entire display and the electronics are shielded in the conductive mesh. For example, the micro lens array can be covered with a layer of micro Thomaston Mesh of 0.001 inch thick and 50×50 mesh per square inch. For non-MRI applications, the conductive mesh shielding may be omitted.

In between the micro lens array 54 and the conductive layers 56A, 56B is the display layer 52, typically including a printed circuit incorporating the elements (RGB) and the wiring which will be connected to a driver. The OLED display layer and the micro lens array are protected by non-conductive transparent or translucent layers such as 58A, 58B (FIG. 2A).

The display 50 is electrically driven and controlled by a video driver (not shown in FIG. 2). For applications other than use in an MRI installation, which do not require rf shielding, the conductive mesh layers 56A, 56B may be omitted.

Figure 3:
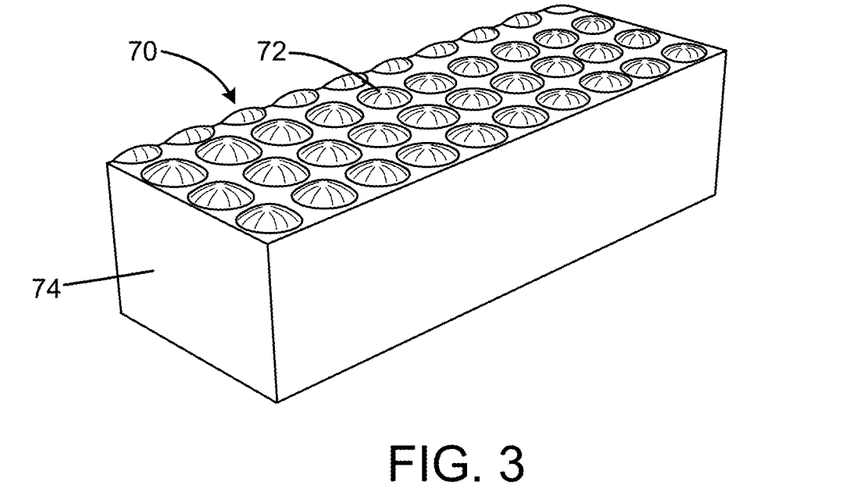
FIG. 3 illustrates an exemplary polymer micro lens array including an array of lenses or lenslets on a transparent medium.

FIG. 3 illustrates an example of a planar polymer micro lens array 70 comprising an array of lenses or lenslets 72 on a transparent medium or substrate 74. This can be molded into a rigid curved form to serve as the micro lens array structure 54 (FIG. 2), and the OLED/circuitry may be printed onto the back surface, registered with the lens elements themselves. The front surface and the back surface are curved, and parallel to each other, in this embodiment.

While the exemplary embodiments illustrated in FIG. 2 and FIG. 3 feature a substrate which supports both the lenslets and the display layer 52 on opposed curved, parallel surfaces, other arrangements may be employed. For example, the lenslets of the micro array may be supported on a relatively thin curved transparent substrate, e.g. 50 um thick, that is separated from the curved display emitters by an air gap, e.g. approximately 10 mm. The display emitters may be formed into a rigid curved shape, or supported on another transparent substrate. The display emitters and the lenslets are still registered in relation to each other, and preferably have the same pitch.

Figure 4:
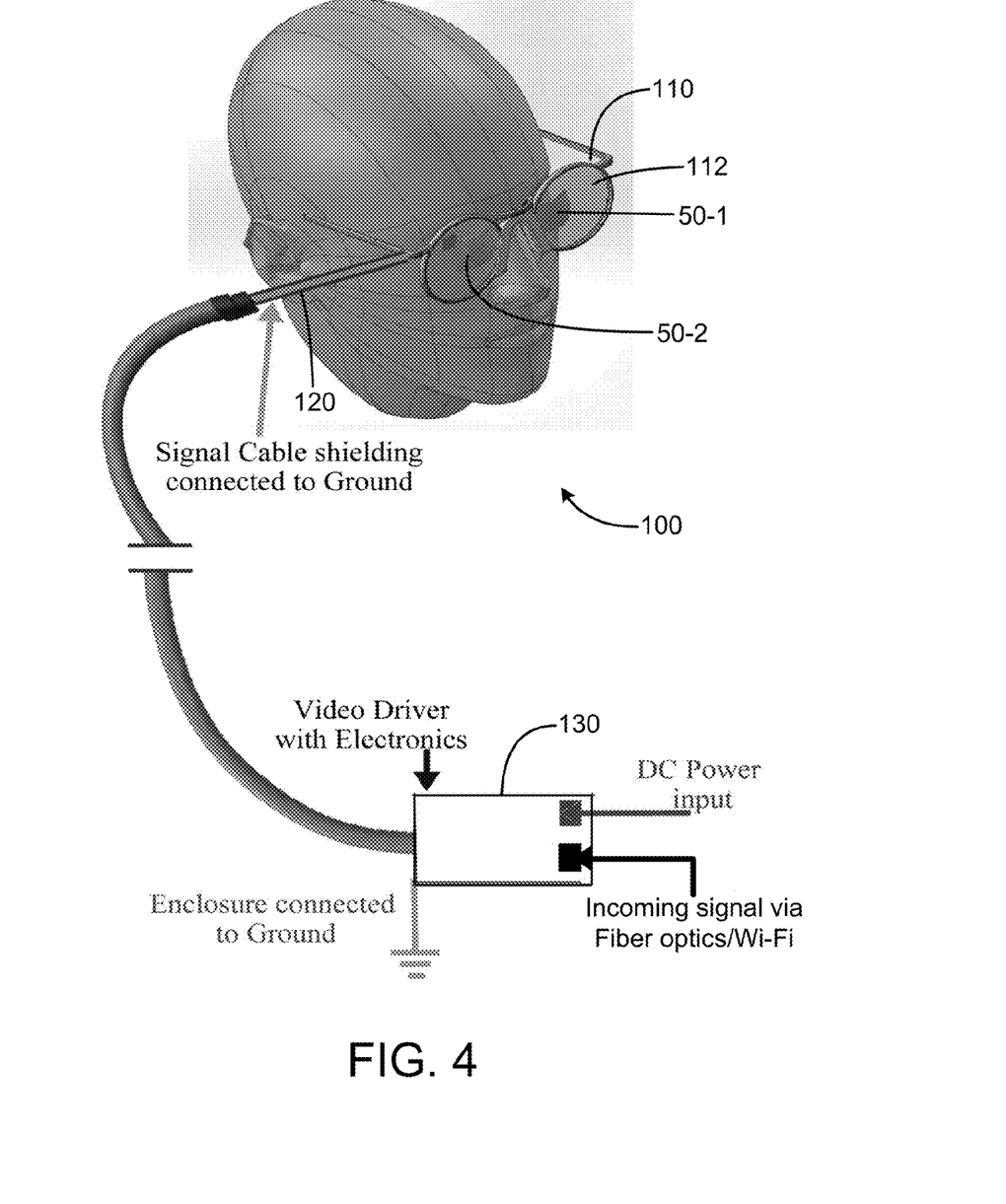
FIG. 4 is a diagrammatic view of an exemplary embodiment of a binocular personal display on a user's head.
Figure 5:
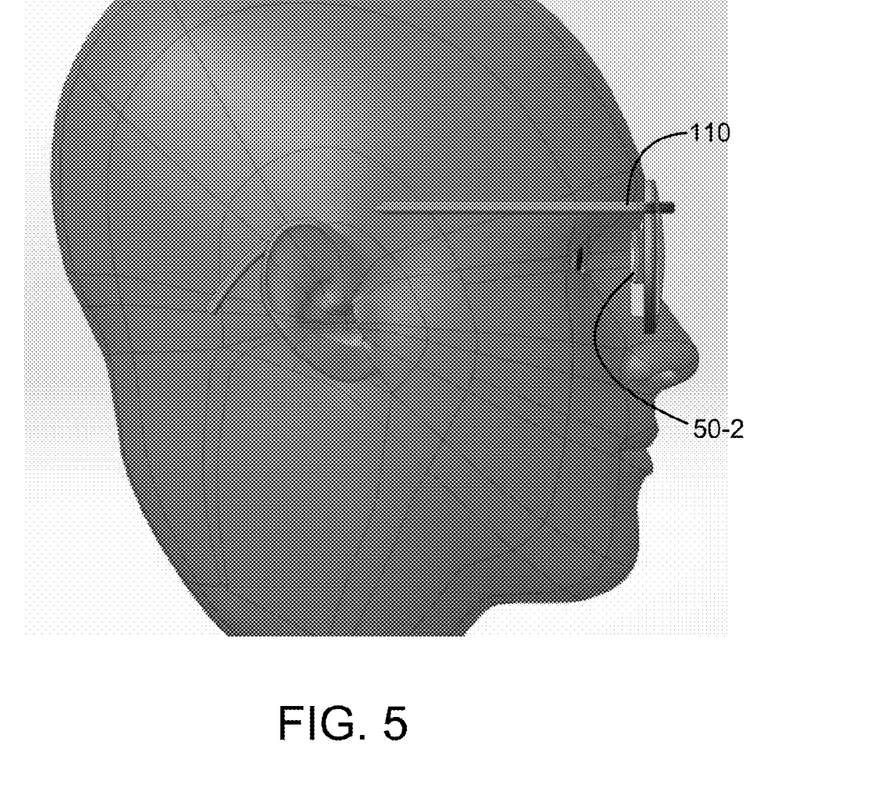
FIG. 5 is a side view of the display system of FIG. 4, with the curved displays sitting within a spectacle frame on a user's face, with the cable not shown in this view.

FIGS. 4 and 5 illustrate an exemplary embodiment of a binocular display system 100, configured for use in an MRI tube. FIG. 4 illustrates an example of how the display can be mounted in various frames or built-in a visor shape eyewear. All the necessary drive electronics can be placed in a separate box 130 away from the person's face. The system includes a pair of low profile curved displays 50-1, 50-2, supported within a pair of spectacle frames 110 that may be worn during MRI treatments. FIG. 5 is a diagrammatic side view of the display system, with the curved displays sitting within a spectacle frame on a user's face. The curved displays have a low profile, even lower than the spectacles themselves. Power conditioning circuit elements such as a filter made of capacitors and resistors may be mounted in front of the spectacles, or to the side. Such filter components can be fabricated of nonferrous materials, and located closer to the display than module 130 (FIG. 4). The frame 110 has mounted therein respective transparent substrates or lenses 112, and the displays 50-1 and 50-2 are mounted on the inner surface of the substrates. A signal cable 120 is attached to a connector supported by the frames to convey video drive signals from the shielded module 130 to the curved displays 50-1, 50-2. In an exemplary embodiment, the display system can support an 85 degree horizontal FOV with a 16:9 format; other formats could be supported as well.

Figure 2B:
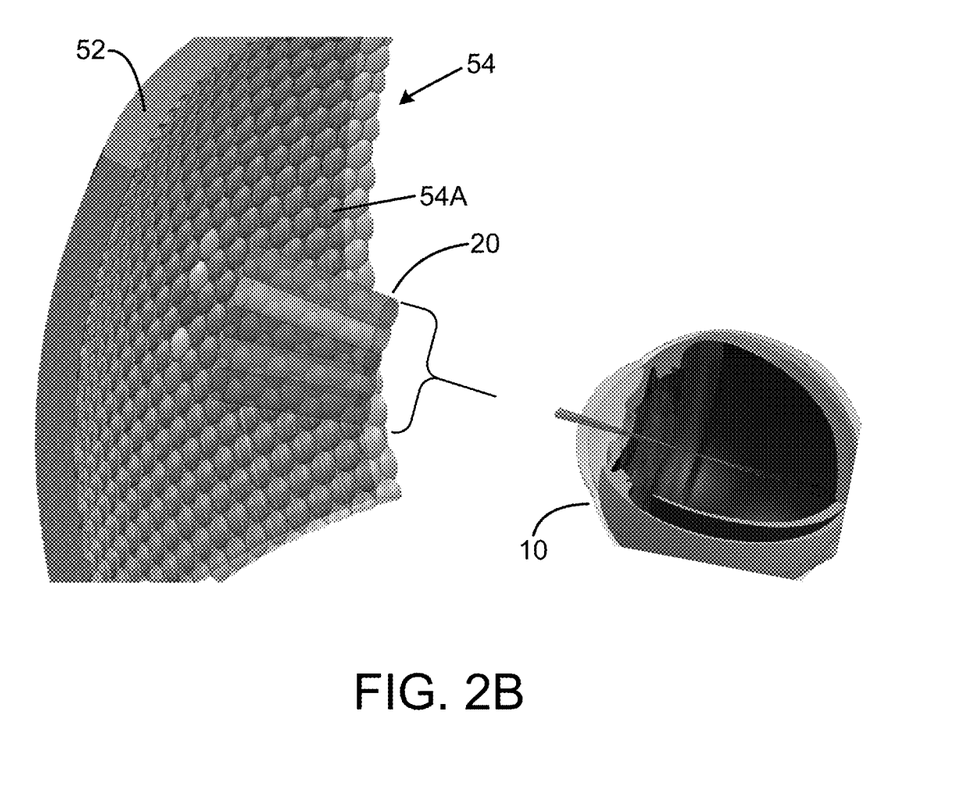
FIG. 2B is a side view of the display projector.

Typical micro lens array element (e.g. lenslets 72 in FIG. 3) diameters will be between 30 and 150 um for a high resolution display system. FIG. 2B shows an exemplary representation of a curved display segment, greatly enlarged and curvature exaggerated for clarity. FIG. 2B shows an array of pixels of the OLED display layer 52 illuminated, each generating a quasi or relatively collimated beam 20 of a certain color, depending on the RGB mix. These colors could also be Cyan, Yellow and Magenta (CYM) or CYMK (K or Key=Black). For ultimate resolution, these beams will have divergences less than 1 arc minute, but for reasonable displays, even 5 arc minutes would be acceptable.

The "quasi-collimated" beams or rays enable the pixel to appear to be coming from a distance and so will easily be focused by the eye. The relative divergence of the "collimated" beam will, when passing through the optics of the eye, form a certain spot size on the retina. This spot size can be compared to the relative retinal cone size. The human visual system has a quoted spatial resolution of 1 arc minute, or about 5 um on the retina. That means a maximum beam divergence of 1 arc minute (300 urad) will produce the optimal spot diameter on the retina. To obtain a 300 urad divergence for a 10 um OLED pixel size, an individual micro lens will have a focal length of about 30000 um (tan−1(10/30000) ~300 urad). A 30 mm lenslet dimension may be too thick for many applications, but for 3 um pixels, for example, the thickness drops to 10 mm. So, for a 150 um diameter micro lens, the f/#=1000/150=6.7, very reasonable for polymer material. The pixel pitch, i.e. the spacing between adjacent lens centers, will be ~150 um on the horizontal. For a 30 um diameter micro lens, the f/# will be 1000/30 or ~33. So, for the micro lens array, the tradeoff will be resolution vs. light gathering capability.

The pixel size and spacing will depend on the resolution of the display. For example, for SXGA OLED resolution, with a format of 1280×200 pixels, the aspect ratio of the pixels may be 12 micron square. For WUXGA OLED resolution, with a format of 1920×1200 pixels, the pixel aspect ratio may be 9.6 micron square.

Another issue which may prevent the micro lens array from getting too small will be cross-talk. As the micro lenses get packed closer and closer together, light from adjacent pixels will get through the same aperture as the primary pixel in consideration. The smaller the native pixel size, and the faster the f/# of the micro array lenslet, the less this will be a problem. In FIG. 2B, the OLED pixel array is aligned with the micro lens array, projecting distinct colored (and relatively collimated) beams 20 of light towards the viewing eye 10, which images these pixels on the retina, impinging on the foveal cone array of the human eye.

Figure 6:
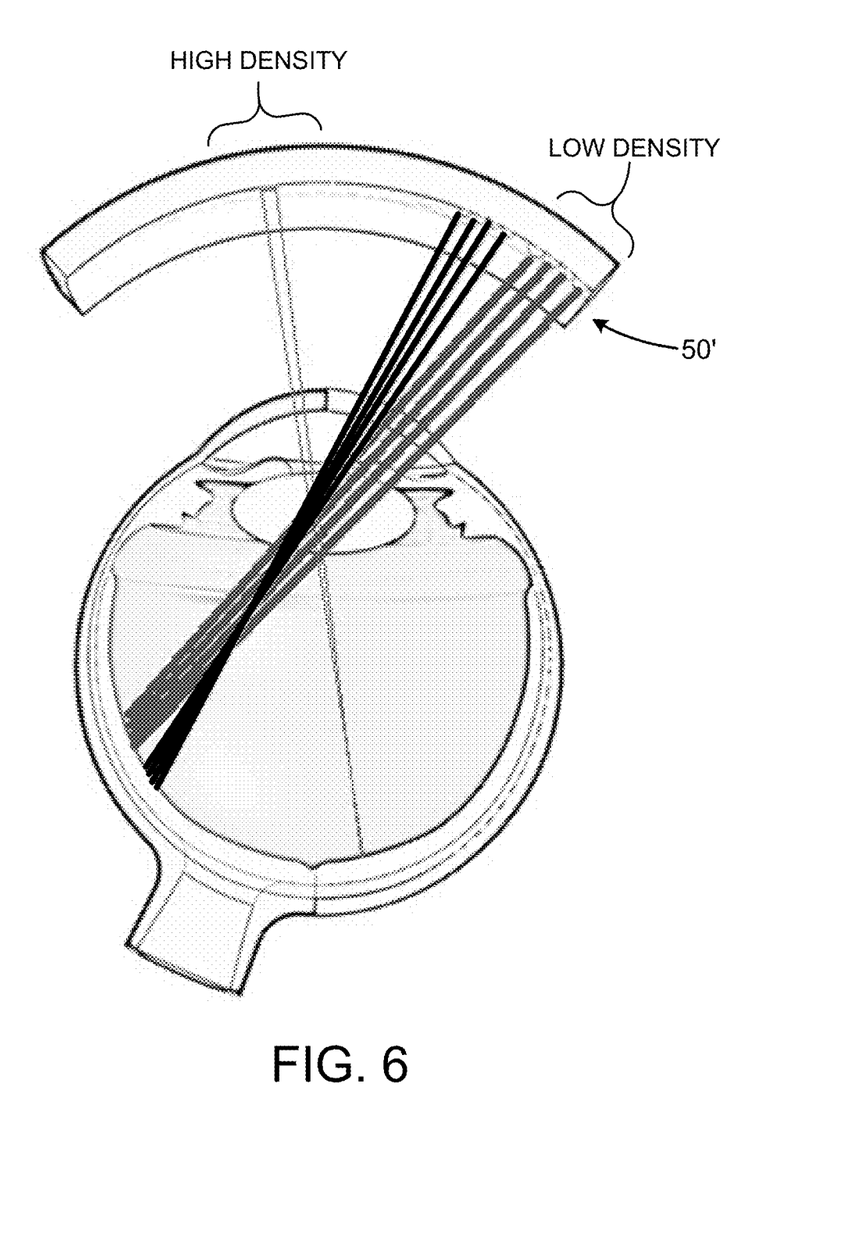
FIG. 6 illustrates an exemplary embodiment of a personal curved display projector in which the peripheral pixels are larger and of lower density than the pixels closer to the center of the display.

The display pixel density (and hence the micro lens array density) does not need to be uniform across the field of view. It is known that the peripheral resolution of the eye is ⅕ that of the central cone resolution. This non-uniformity is relatively easy to achieve with the curved OLED personal display as described above, since the OLED pixels may be printed on the display surface, the spacing and size can be printed to whatever geometry supports the spatial resolution at that point in the FOV. Also, the micro lens array can be configured to conform to the variable OLED density, with highest density OLED pixels being printed or disposed in the center of the display. The advantage then is that the peripheral pixels can be much larger and subtend lower spatial resolution than the center pixels. This can make it much easier to display high data rate imagery, such as that found in video gaming. FIG. 6 illustrates a display 50' in which the peripheral pixels are larger and of lower density than the pixels closer to the center of the display.

The challenge then, for non-uniform pixel spacing, is that the video signals driving the display become non broadcast standard, or that broadcast standard video input must be pre-processed prior to being sent to this display. A video "warping" processor may be used. Video warping processors are known, e.g. the Optoma Chameleon GB-200 image blending and warping processor.

Figure 7:
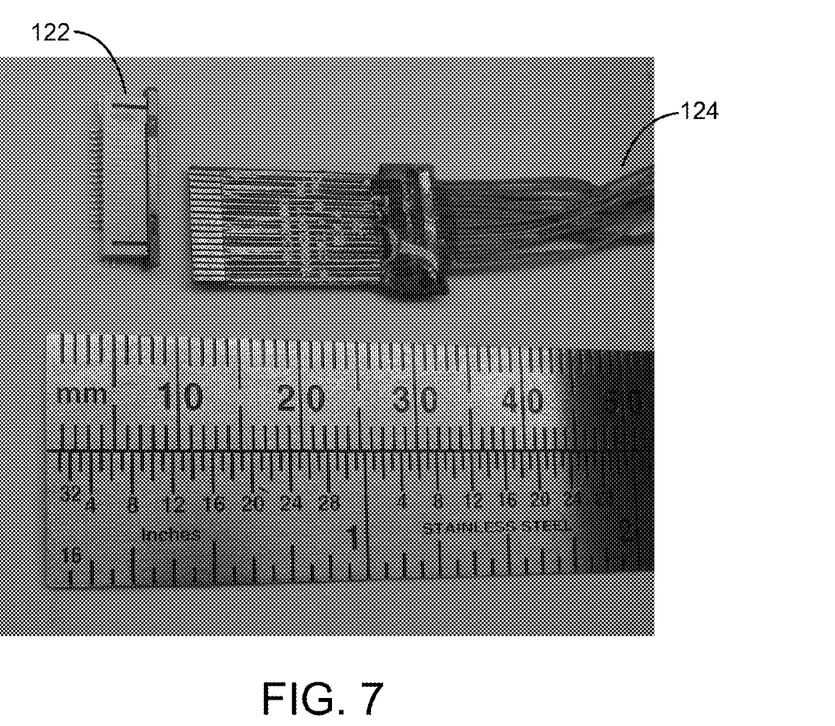
FIG. 7 shows an exemplary connector and wiring ribbon or bundle that may be used for a curved personal display projector.

In an exemplary embodiment, the cable 120 connected between the display system, e.g. system 50 in FIG. 4, may be electrically connected to the OLED layer such as layer 52 by a connector 122 (FIG. 7). FIG. 7 shows a typical type of connector and micro coaxial cable to deliver power and signals to the OLED display from the driver circuit. The connector is also connected to the ribbon cable or wiring bundle 124 of the signal cable 120. The opposite end of the signal cable is connected to a video driver 130, which has a nonferrous enclosure, e.g. brass, phosphor bronze or aluminum, connected to ground for MRI applications. The driver 130 has a power input as well as an incoming video signal, e.g. from a fiber optic or Wi-Fi link.

An exemplary embodiment of the personal display may provide one or more of the following benefits and advantages:

A personal display that reduces basic projection distortions by allowing additional design freedom in the curvature of the display (all previous systems are limited to a flat display projector).

A personal display that allows for significant growth in the Field of View by correcting for projection distortions via an additional design degree of freedom (display curvature).

A personal display that provides for more uniform illumination of the projected image across the field of view, due to the curved display projector.

A personal display that provides for a more immersive viewing experience that occurs when projection distortions are reduced, and field of view is increased.

A personal, wide angle, immersive display that is low profile, and will increase patient comfort within medical imaging equipment (MRI, PET, etc.).

A personal wide angle, immersive display that takes advantage of flexible display technologies, as well as transparent micro lens arrays that can be configured for projecting display pixels in focus to the human retina with minimal working distances.

Although the foregoing has been a description and illustration of specific embodiments of the subject matter, various modifications and changes thereto can be made by persons skilled in the art without departing from the scope and spirit of the invention.

What is claimed is:

1. A personal display projector configured for positioning in proximity to a user's eyeball, comprising:
    a curved display layer formed by a flexible polymer substrate and an array of organic light emitting diodes (OLEDs) embedded into or attached to the flexible polymer substrate, the array of OLEDs defining an array of pixels having a display curvature;
    a curved micro lens array having a curvature matching the display curvature and positioned relative to the display layer so that the micro lens array is positioned between the display layer and the user's eyeball, the display layer configured to illuminate the micro lens array with image light rays, the micro lens array configured to collimate or quasi collimate the image light rays so as to represent an image in a far field relative to the eyeball, allowing the user's eyeball to focus on the image; and
    a rigid substrate having a back side relative to the eyeball, said back side having a back side curved surface defining said display curvature, the curved display layer attached to the back side curved surface of the substrate, the substrate having a front curved surface facing the eyeball and defining said curvature of the micro lens array, and the micro lens array is disposed or formed on the front curved surface of the substrate; and
    wherein the display projector is configured to provide a wide horizontal field of view greater than 70 degrees for the user's eyeball.

2. The projector of claim 1, further comprising an electrically conductive mesh surrounding the display layer and the micro lens array.

3. The projector of claim 2, further comprising a translucent or transparent protective layer formed outside of the conductive mesh.

4. The projector of claim 1, further comprising:
    electrically conductive mesh layers sandwiching the curved display layer, the substrate and the curved micro lens array; and
    transparent or translucent protective layers formed on the outside of the electrically conductive layers.

5. The projector of claim 1, wherein the substrate is a transparent rigid polymer substrate.

6. The projector of claim 1, wherein the display layer has a non-uniform pixel density across a horizontal field of view of the user.

7. The projector of claim 6, wherein pixels in the center of the display have a pixel density higher than pixels at the periphery of the display.

8. The projector of claim 1, wherein the display curvature is a sector of a spherical or cylindrical curvature.

9. The projector of claim 8, wherein said curvature has a radius configured to subtend at least 85 degrees horizontally of the user's field of view.

10. The projector of claim 9, wherein the radius is further configured to subtend greater than 45 degrees vertically of the user's field of view.

11. The projector of claim 1, further comprising:
    an electronic driver circuit electrically connected to the display layer to provide display signals to the display layer.

12. The projector of claim 1, wherein the micro lens array comprises an array of lenslets having diameters between 30 and 150 micrometers.

13. The projector of claim 1, wherein the display layer comprises pixels having a pitch between 10 um and 200 um.

14. The projector of claim 1, wherein the display layer includes Organic Light Emitting Diodes (OLEDs).

15. A binocular personal display system, comprising:
    first and second wide angle personal display projectors, each configured for positioning in proximity to a user's corresponding left or right eyeball, each of said first and second projectors configured to provide a wide horizontal field of view greater than 70 degrees for the user's eyeball, each projector comprising:
        a curved display layer formed by a flexible polymer substrate and an array of organic light emitting diodes (OLEDs) embedded into or attached to the flexible polymer substrate, the array of OLEDs defining an array of pixels having a display curvature;
        a curved micro lens array having a curvature matching the display curvature and positioned relative to the display layer so that the micro lens array is positioned between the display layer and the user's eyeball, the display layer configured to illuminate the micro lens array with image light rays, the micro lens array configured to collimate or quasi collimate the image light rays so as to represent an image in a far field relative to the eyeball, allowing the user's eyeball to focus on the image; and
        a rigid substrate having a back side relative to the eyeball, said back side having a back side curved surface defining said display curvature, the curved display layer attached to the back side curved surface of the substrate, the substrate having a front curved surface facing the eyeball and defining said curvature of the micro lens array, and the micro lens array is disposed or formed on the front curved surface of the substrate; and
    a frame for supporting the first and second projectors in proximity to the user's left and right eyeballs.

16. The system of claim 15, wherein each of said projectors includes an electrically conductive mesh surrounding the display layer and the micro lens array to provide rf shielding.

17. The system of claim 16, further comprising a translucent or transparent protective layer formed outside of the conductive mesh.

18. The system of claim 15, wherein each of the projectors further comprises:
    electrically conductive mesh layers sandwiching the curved display layer, the substrate and the curved micro lens array; and
    respective transparent or translucent protective layers formed on the outside of the electrically conductive layers.

19. The system of claim 15, wherein the display layer has a non-uniform pixel density across a horizontal field of view of the user.

20. The system of claim 19, wherein pixels in the center of each of the displays have a pixel density higher than pixels at the periphery of the display.

21. The system of claim 15, wherein said display curvature has a radius configured to subtend at least 85 degrees horizontally of the user's field of view.

22. The system of claim 21, wherein the radius is further configured to subtend greater than 45 degrees vertically of the user's field of view.

23. The system of claim 15, further comprising:
an electronic driver circuit electrically connected to the display layer to provide display signals to the display layer.

24. The system of claim 23, wherein the driver circuit is disposed within a non-ferrous housing structure.

25. The system of claim 15, wherein wherein the substrate of each of the projectors is a transparent rigid polymer substrate.

* * * * *